United States Patent [19]
Jones, Jr.

[11] Patent Number: 6,095,268
[45] Date of Patent: Aug. 1, 2000

[54] CHILDREN'S RIDE-ON VEHICLE WITH INDEPENDENTLY DRIVEN AND REVERSIBLE WHEELS

[75] Inventor: John L. Jones, Jr., East Aurora, N.Y.

[73] Assignee: Mattel, Inc., El Segundo, Calif.

[21] Appl. No.: 09/015,044

[22] Filed: Jan. 28, 1998

[51] Int. Cl.$^7$ .................................................. B62D 11/04
[52] U.S. Cl. ............................ 180/6.5; 180/22; 180/65.5; 180/65.6
[58] Field of Search ............................. 186/6.5, 22, 65.5, 186/675.6, 6.48, 20, 21, 24.07; 446/443, 454, 462, 460, 465, 456, 433, 469, 457, 463, 466; 434/62, 66, 29

[56] References Cited

U.S. PATENT DOCUMENTS

| | | |
|---|---|---|
| 2,330,958 | 10/1943 | Danforth . |
| 3,154,162 | 10/1964 | McCaleb et al. . |
| 3,481,417 | 12/1969 | Jarret et al. . |
| 3,616,869 | 11/1971 | Rilling . |
| 3,763,945 | 10/1973 | Danielson . |
| 3,842,928 | 10/1974 | Kishi . |
| 4,516,648 | 5/1985 | Berger et al. . |
| 4,541,051 | 9/1985 | Jarret et al. . |
| 4,562,893 | 1/1986 | Cunard ..................................... 180/6.5 |
| 4,655,724 | 4/1987 | Law . |
| 4,913,253 | 4/1990 | Bowling . |
| 5,429,543 | 7/1995 | Tilbor et al. ............................. 446/456 |
| 5,571,999 | 11/1996 | Harris ...................................... 200/565 |

Primary Examiner—Brian L. Johnson
Assistant Examiner—Bridget Avery
Attorney, Agent, or Firm—Kolisch, Hartwell, Dickinson, McCormack & Heuser

[57] ABSTRACT

A children's ride-on vehicle is provided with a chassis formed at least in part of molded plastic, a seat mounted to the chassis and configured to accommodate a driver, and first and second driven wheels mounted to the chassis on opposite sides of the seat. The wheels are coaxially rotatable in a first plane and a second plane, wherein the wheel planes are substantially parallel to one another. A motive power source for the wheels, including a battery and two electric motors is mounted to the chassis and is operable to drive each wheel selectively in a forward direction or a reverse direction under control of a foot-pedal power/braking switch and two armrest-mounted joysticks. Each joystick has three positions, neutral, reverse, and forward and the child can press both forward to go forward, press both in reverse to go backwards, press one forward and one in reverse to spin clockwise or counterclockwise about a central point, or press one in forward or reverse and leave the other in neutral, allowing coasting of the associated wheel for turning in a gentle arcing fashion. Moving both joysticks to neutral allows coasting of the vehicle while a foot pedal is depressed. A caster wheel mounted to the chassis aft of the driven wheels is configured to cooperate with the driven wheels to hold the chassis in a level attitude. A skid pad mounted to the chassis forward of the driven wheels is configured to contact and slide along the surface to maintain the chassis generally in the level attitude, when the caster wheel loses contact with the surface.

22 Claims, 7 Drawing Sheets

CHILDREN'S RIDE-ON VEHICLE WITH INDEPENDENTLY DRIVEN AND REVERSIBLE WHEELS

BACKGROUND AND SUMMARY OF THE INVENTION

The present invention relates generally to children's ride-on vehicles. More specifically, the invention concerns a children's ride-on vehicle having a single, central axle mounting two parallel, coaxially rotatable, reversible wheels driven separately by two independently controlled battery-powered motors which can be operated by a child for forward and reverse travel, left and right turning, and clockwise or counterclockwise spinning about a central point.

Children's ride-on vehicles have proliferated in recent years, often imitating on a smaller scale the features of full-size vehicles. The vehicles generally have two rear wheels driven by one or two motors powered by one or two batteries and one or two front wheels steered by handlebars or a steering wheel. To operate the vehicle, a child selects the speed and direction for the rear wheels with switches, presses and holds a power switch, and steers with the handlebars or steering wheel, mimicking the operation of a full-size vehicle.

The present invention, however, provides a new vehicle, wholly unlike grown-ups' vehicles in both appearance and function. In this vehicle, the handlebar or steering wheel are eliminated and, instead, the driver controls the vehicle with two joysticks, one for each hand. The normal body is eliminated in favor of a generally circular body with an axle across a diameter and the wheels mounted parallel to one another at the ends of the axle roughly at an outer edge of the circular body. A seat within the circle is surrounded around three-quarters of the circle by high sidewalls topped by armrests mounting the joysticks.

Each joystick has three positions, neutral, reverse, and forward and the child can press both forward to go forward, press both in reverse to go backwards, press one forward and one in reverse to spin clockwise or counterclockwise about a central point, or press one in forward or reverse and leave the other in neutral, allowing coasting of the associated wheel for turning in a gentle arcing fashion. Moving both joysticks to neutral allows coasting of the vehicle while a foot pedal is depressed.

Each joystick controls a permanent-magnet DC electric motor, with one motor being provided for each of the two driven wheels. Each motor is wired to rotate in a first direction with its associated joystick pressed forward, to rotate in a second direction, opposite the first, with its associated joystick pulled back, to free-wheel with the joystick in neutral, and to brake dynamically when the foot pedal is released. The motors are each connected through one of two reduction gear trains to one of the wheels. The motors spin at the same speed in each direction.

A caster wheel is provided on the perimeter of the body behind the axle and a seat is disposed over and behind the axle nominally to distribute the driver's weight over the driven wheels and the caster wheel. Because the motors spin at the same speed and all three wheels are located roughly on the circumference of the same circle, with the driver positioned at or near the center, minimizing the vehicle's moment of inertia, the vehicle can spin very tightly and very efficiently about a central, vertical axis.

A general object of this invention is to provide a child's ride-on vehicle steered directly through manipulation of the power train. The invention eliminates ordinary methods of steering control, where a steered wheel is redirected relative to the vehicle body via a steering column, in favor of a point-there-go-there technique wherein the driver can change the heading of the vehicle at any time and then drive the vehicle along its heading.

It is another object of this invention to provide a vehicle which the driver can spin in an optimal and unlimited manner about a central axis. Another object of the invention is to provide such a vehicle with a separate motor and gear train for each wheel for ease of manufacture and assembly. The motors each have a permanent-magnet stator and an armature winding, and both motors are powered by a single battery, for clean, efficient, long-lived, and safe operation.

A further object of the invention is to provide the spinnable vehicle with a centrally positioned, low seat that is surrounded on three sides with near vertical, close-fitting side walls which extend nearly up to the child's shoulders and provide arm rests to give the child maximum body support during erratic or rapidly-changing maneuvers. A further object of the invention is to provide a skid pad opposite the caster wheel to arrest forward tipping of the vehicle under extreme braking or engine-reversing.

Yet another object of the invention is to provide the vehicle with armrest-mounted joysticks and a foot pedal that disables the joysticks until the foot pedal is depressed to prevent inadvertent operation of the motors while entering and exiting the vehicle. A further object of the invention is to provide the vehicle with motor dynamic braking regardless of the position of the joysticks for controlled stopping of the vehicle. A still further object of the invention is to provide neutral positions for the joysticks allowing freewheeling of the motors for coasting with both joysticks in neutral, or gentle turning with one joystick in neutral.

These and additional objects and advantages of the present invention will be more readily understood after a consideration of the drawings and the detailed description of the preferred and alternative embodiments.

DETAILED DESCRIPTION OF THE PREFERRED EMBODIMENT

Figure 1:
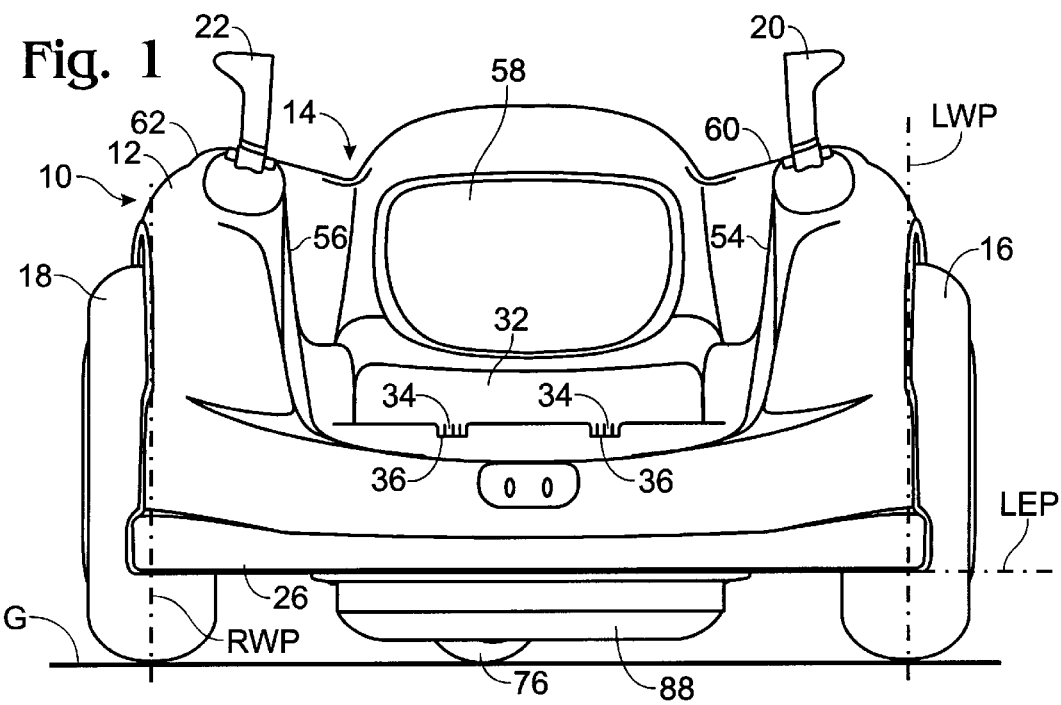
FIG. 1 is a front elevation view of a vehicle according to the present invention, showing a body with two driven wheels on opposite sides of the body, a seat between the wheels, and two joysticks mounted on anmrests adjacent the seat.
Figure 2:
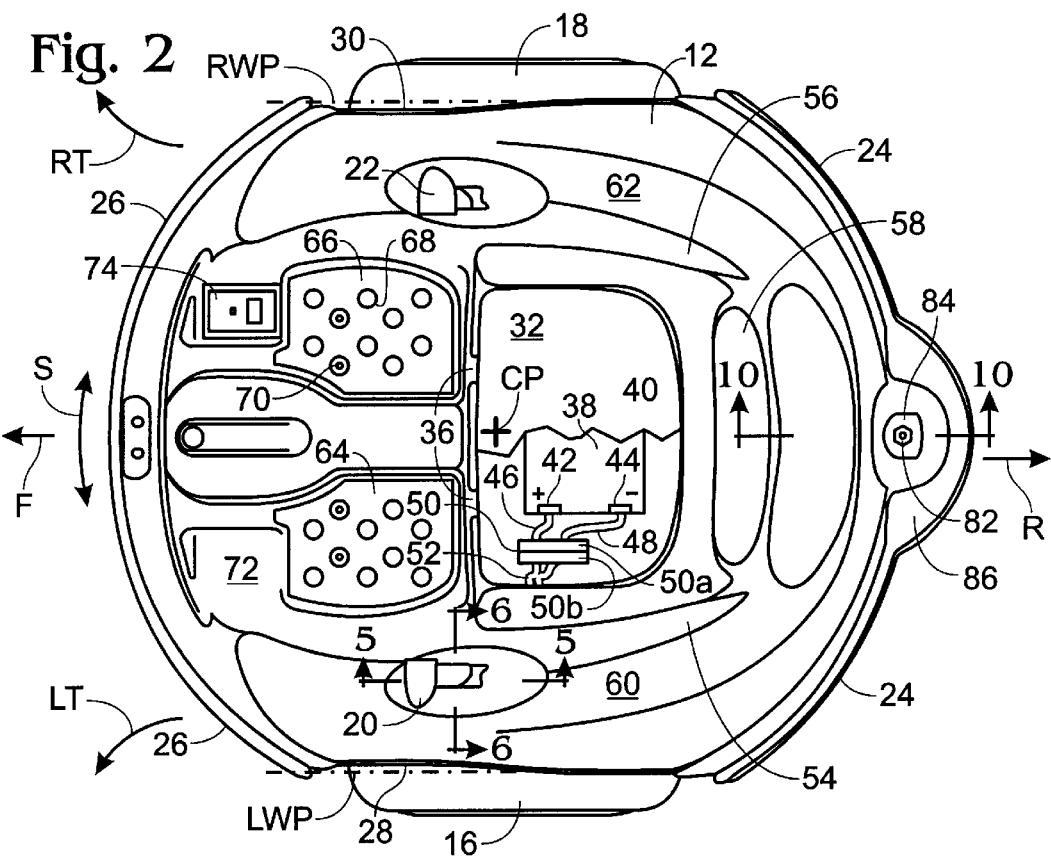
FIG. 2 is an overhead plan view of the vehicle of FIG. 1 with a cutaway on the seat, showing a battery in a compartment beneath the seat and a foot pedal to control power on the vehicle.

As shown in FIG. 1, a vehicle, built according to the present invention and indicated generally at 10, includes a body or chassis 12 providing a seating area 14 to accommodate a driver, a left side wheel 16, a right side wheel 18, and two ergonomically contoured left and right joysticks 20, 22, respectively. Wheels 16, 18 are coaxially rotatable in a pair of planes, LWP, RWP, respectively which are generally vertical and bisect the wheels as shown in FIGS. 1 and 2. Planes LWP and RWP are parallel to the page of FIG. 3 and are substantially parallel to one another.

The overhead view of FIG. 2 best illustrates the generally circular shape of chassis 12 which includes a rear bumper or lip 24 and a front bumper or lip 26 interconnected by wheel wells 28, 30, on the left and right respectively. Bumpers 24, 26 form a lower edge for the chassis which defines a plane LEP which is generally parallel to the ground or other plane surface G upon which the vehicle rests in a nominally level attitude. Planes LWP, RWP intersect the ground at the centerpoint of the wheels' contact at the ground and are typically about 24.4-inches apart. Chassis 12 is typically about 33.5-inches from the frontmost portion of front bumper 26 to the rearmost rear portion of bumper 24 and is typically about 26.6-inches across at the greatest width of the bumpers.

Seating area 14 includes a removable seat 32 which is releasably attached at a front edge to chassis 12 by two tabs 34 having a latching mechanism inserted in two slots 36 in chassis 12. Two additional tab-slot combinations are provided at the rear edge of seat 32 to connect the seat to the chassis.

A lead-acid, rechargeable, 6-volt battery 38 is held in a compartment or battery case 40 beneath seat 32 with positive and negative output terminals 42, 44 connected by wires 46, 48 to a connector 50. The battery is charged by decoupling the halves 50a, 50b of connector 50 and plugging a charger into half 50a. Connector half 50b is connected to a wiring harness 52 which interconnects the battery with other components as will be described in detail below.

Seating area 14 includes left and right sidewalls 54, 56 which provide lateral support to the driver and a seat back 58 for rear support of the driver. Atop walls 54, 56, left and right armrests 60, 62 are provided at a height roughly even with, or slightly lower than the child driver's shoulders. When the driver operates the vehicle, the driver's back is against seat back 58, the arms are generally level on armrests 60, 62 with the hands gripping joysticks 20, 22, and the sides of the chest are adjacent side walls 54, 56. The seating area thus provides structure against which the driver can lean or press the back, the arms, and the chest to maintain balance and position while maneuvering the vehicle. Armrests 60, 62 are configured to allow the driver to push the arms down and thereby place substantial weight on the armrests to maintain the driver's balance and position during vehicle maneuvering.

As best seen in FIG. 2, chassis 12 also includes in front of seat 32 two foot wells 64, 66 with a grid of small knobs 68 for improved traction and four holes 70 for water drainage. At the front of the left side foot well, a foot rest 72 is provided. A foot pedal 74 is provided in front of the right side foot well configured to be operated by the driver's foot. Foot pedal 74 is nominally biased upward to an off position and can be depressed by the driver's foot to an on position. The off position also provides dynamic braking. The foot pedal ensures that the vehicle will not move under its own power while the driver enters or exits, even though the driver may place the hands on or near armrests 60, 62 and accidentally bump a joystick, because the joysticks are disabled by the foot pedal's being in the off position. Chassis 12 is preferably molded in a single piece of plastic, preferably polypropylene, the single piece including all of the seating area and the foot wells and footrests and battery compartment 40, but not detachable seat 32.

Figure 3:
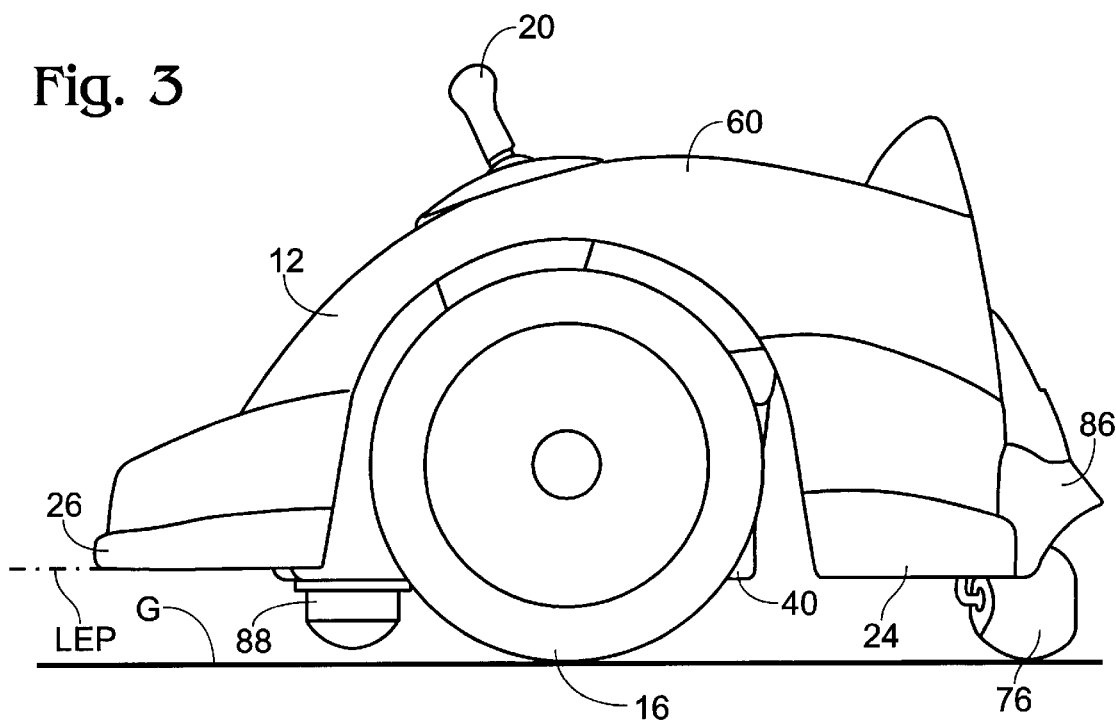
FIG. 3 is a left side view of the vehicle of FIG. 1 showing a rear caster wheel and a front skid pad beneath the vehicle.
Figure 4:
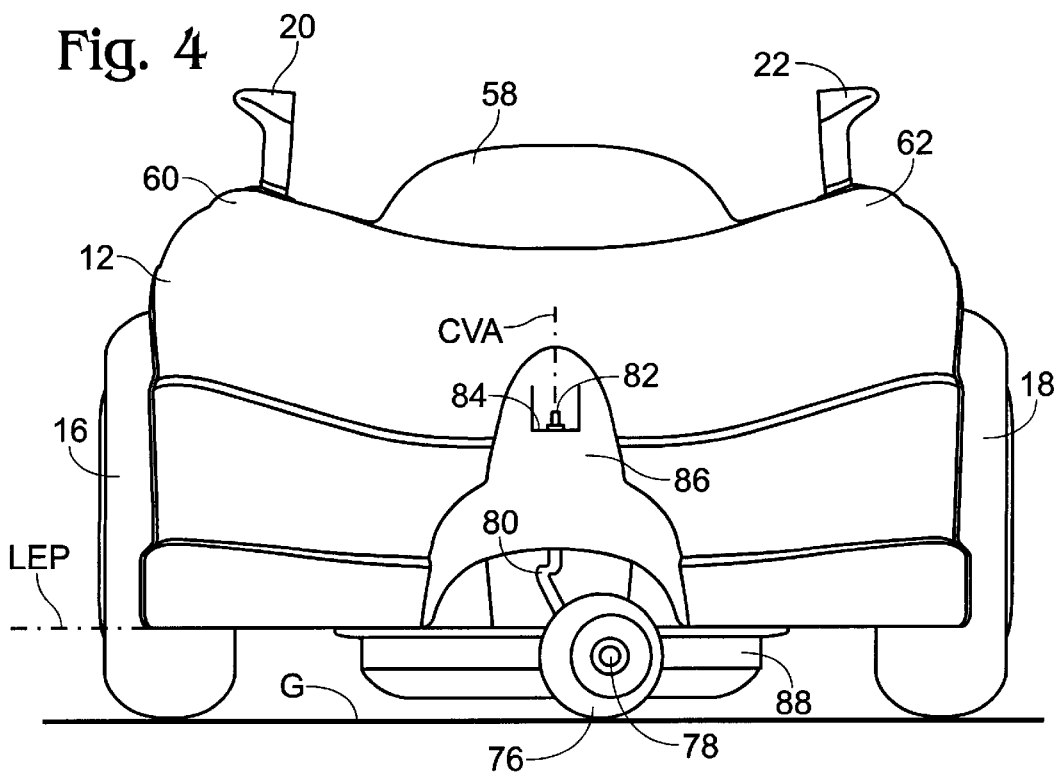
FIG. 4 is a rear elevation view of the vehicle of FIG. 1 showing a mount for the rear caster wheel.

As best seen in FIGS. 3 and 4, a rotatable support, such as spherical caster wheel 76, is mounted to the rear of chassis 12 which is configured to cooperate with wheels 16, 18 to hold the chassis in the level attitude with plane LEP generally parallel to the ground. Caster wheel 76 is rotatable on a horizontal axle 78 mounted on an arm 80 which is pivotally mounted to chassis 12 to pivot about a vertical axis CVA. An upper end 82 of arm 80 is bolted to a boss 84 in a rear extension 86 of chassis 12. Extension 86 is preferably part of the single-piece molded chassis.

A skid pad 88, shown in FIGS. 1, 3, 4, and 7, is bolted to the underside of chassis 12 in front of wheels 16, 18, preferably about ¾-inch above the ground in the level attitude. While the driver sits in the seat and maneuvers the vehicle, the center of gravity is nominally aft of wheels 16, 18 so the vehicle rests on wheels 16, 18 and caster wheel 76. However, under forward braking conditions or when the driver shifts or leans forward, the center of gravity may be forward of wheels 16, 18 and the vehicle will tip forward causing caster wheel 76 to lose contact with the ground. As the vehicle tips however, the skid pad contacts and slides along the ground, maintaining the chassis generally in the level attitude.

Figure 7:
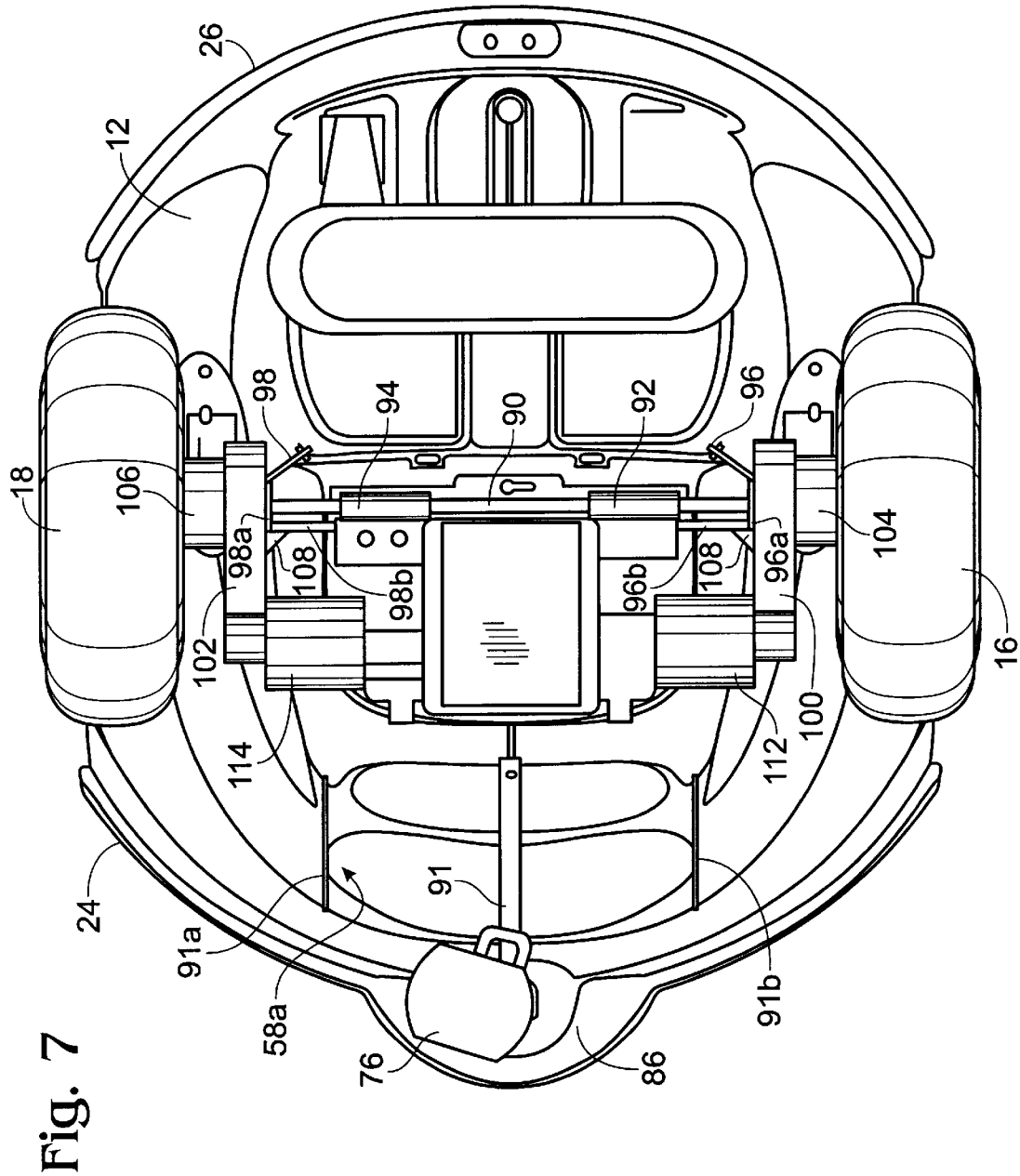
FIG. 7 is a bottom plan view of the vehicle of FIG. 1, showing a pair of gearboxes and motors mounted to the underside of the body and attached to the driven wheels and a structural strut and ribs to stiffen the back of the body.
Figure 10:
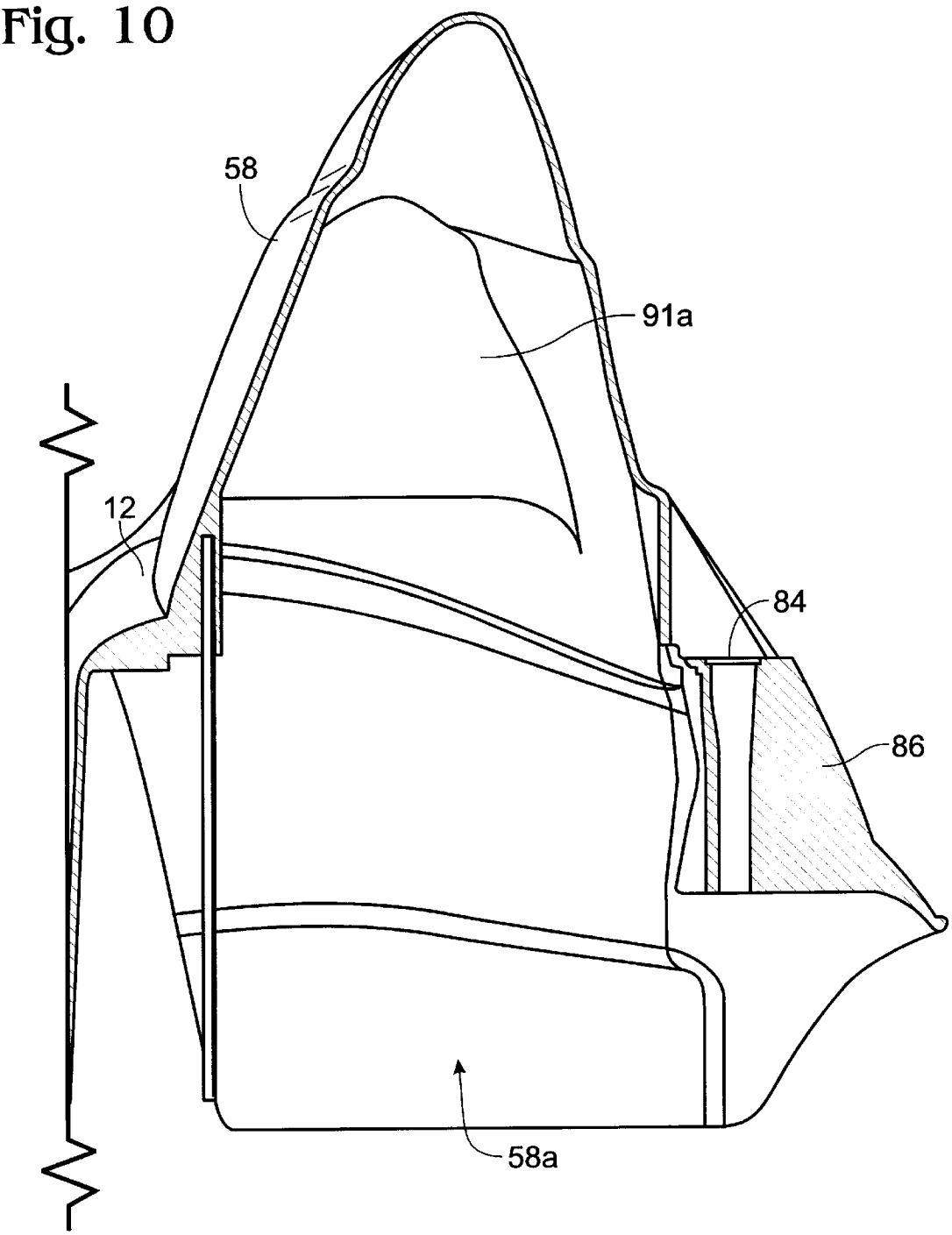
FIG. 10 is a cross-sectional view of the seat back of the vehicle of FIG. 1.

The single-piece chassis generally provides all of the structural support for the vehicle with the aid of a stationary axle 90 which, as shown in FIG. 7, is inserted through two channels 92, 94 on chassis 12 in a position which generally bisects the circular shape of chassis 12. Additional structural support is provided by a spar, such as metal bar 91 across a hollow 58a under seat back 58 in chassis 12. Bar 91 is held in place in boss 84 in extension 86 by end 82 of caster arm 80 and is bolted at the other end to chassis 12 adjacent battery compartment 40. A rib 91a, best seen in FIG. 10, and a parallel rib 91b also extend across hollow 58a to give additional stiffness to seat back 58a. Ribs 91a, 91b are preferably formed as part of the single-piece molding of chassis 12.

Wheels 16, 18, which are typically about 13-inches in diameter, are rotatably mounted at opposite ends of axle 90 which is typically about 28.5-inches long. Caster wheel 76 is mounted with its vertical axis CVA typically about 15" behind axle 90. Seat 32 is typically about 3-inches above axle 90.

Two ribs 96, 98, depend vertically from the underside of chassis 12 and preferably are formed as part of the single-piece molding of chassis 12. The ribs include longitudinal walls 96a, 98a each having a hole through which axle 90 is inserted. Ribs 96, 98 each include a lateral wall 96b, 98b, the purpose of which will be described shortly.

In assembling the vehicle, axle 90 is first inserted through rib walls 96a, 98a and channels 92, 94. Then two gearboxes 100, 102 with attached wheel drivers 104, 106 are loaded onto the axle and the gearboxes are pushed against rib wall 96a, 98a. As best illustrated for left side gearbox 100 in FIG. 10, gearboxes 100, 102 each include two triangular gusset ribs 108 which abut rib walls 96b, 98b, respectively. The gusset ribs' abutting the rib walls prevents rotation of the gearboxes. Wheels 16, 18 are loaded onto the ends of axle 90 outside drivers 104, 106 and are held in place with a standard retainer cap (not shown). Wheels 16, 18 and ribs 96, 98 thus hold gearboxes 100, 102 securely in place.

Two motors 112, 114, which together with the battery comprise a motive power source for the wheels, are mounted on gearboxes 100, 102 and held thereby in fixed relation to the chassis. The motors preferably have a permanent-magnet stator and a rotor with an armature winding powered by DC current from a 6-volt source. The polarity of the voltage applied to the armature determines the direction of rotation of the rotor. The rotor turns a drive shaft 124, 126 (FIG. 8) at a motor revolutions-per-minute (RPM), which is typically about 7,000–12,000 RPM, depending largely on the weight of the driver which is typically less than 65-pounds. The drive shaft turns at substantially the same RPM in the forward and reverse direction. The drive shaft is operatively coupled to a 120:1 reduction gear train in the gearbox which, through drivers 104, 106 turns wheels 16, 18 at a wheel RPM which is less than the motor RPM and is typically about 60–100 RPM. Thus, motors 112, 114 are configured to provide a motive power to wheels 16, 18 to drive each wheel selectively in a forward direction or a reverse direction and the wheel RPM in the forward direction is substantially equal to the wheel RPM in the reverse direction. The resulting forward or reverse vehicle speed with both motors turning the wheels in the same direction is about 4.1-MPH.

Figure 8:
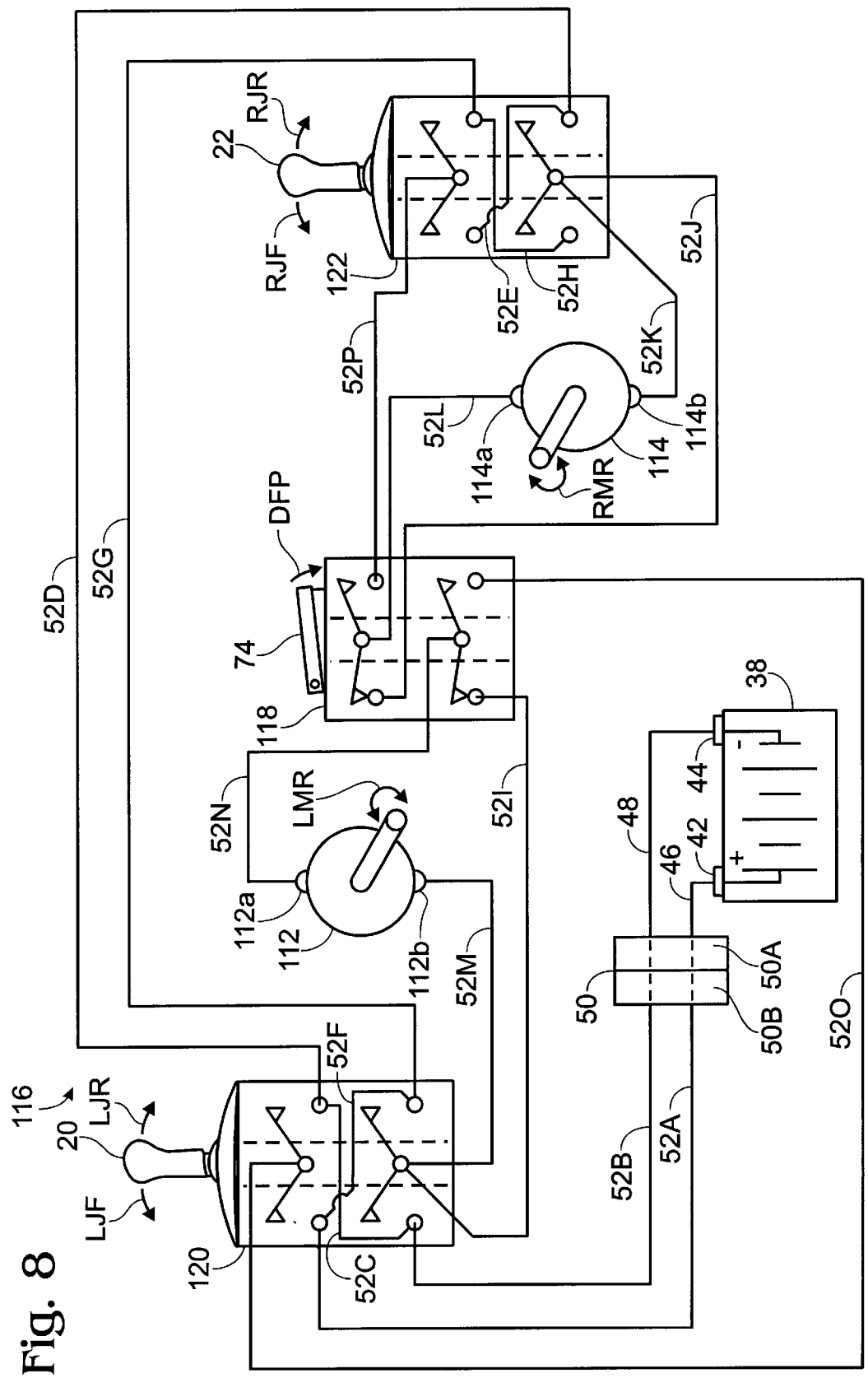
FIG. 8 is a schematic diagram of a switching circuit in the vehicle of FIG. 1, showing a set of wires in a wiring harness that interconnects the direction switches, a foot-pedal-operated power switch, the battery, and the motors.
Figure 9:
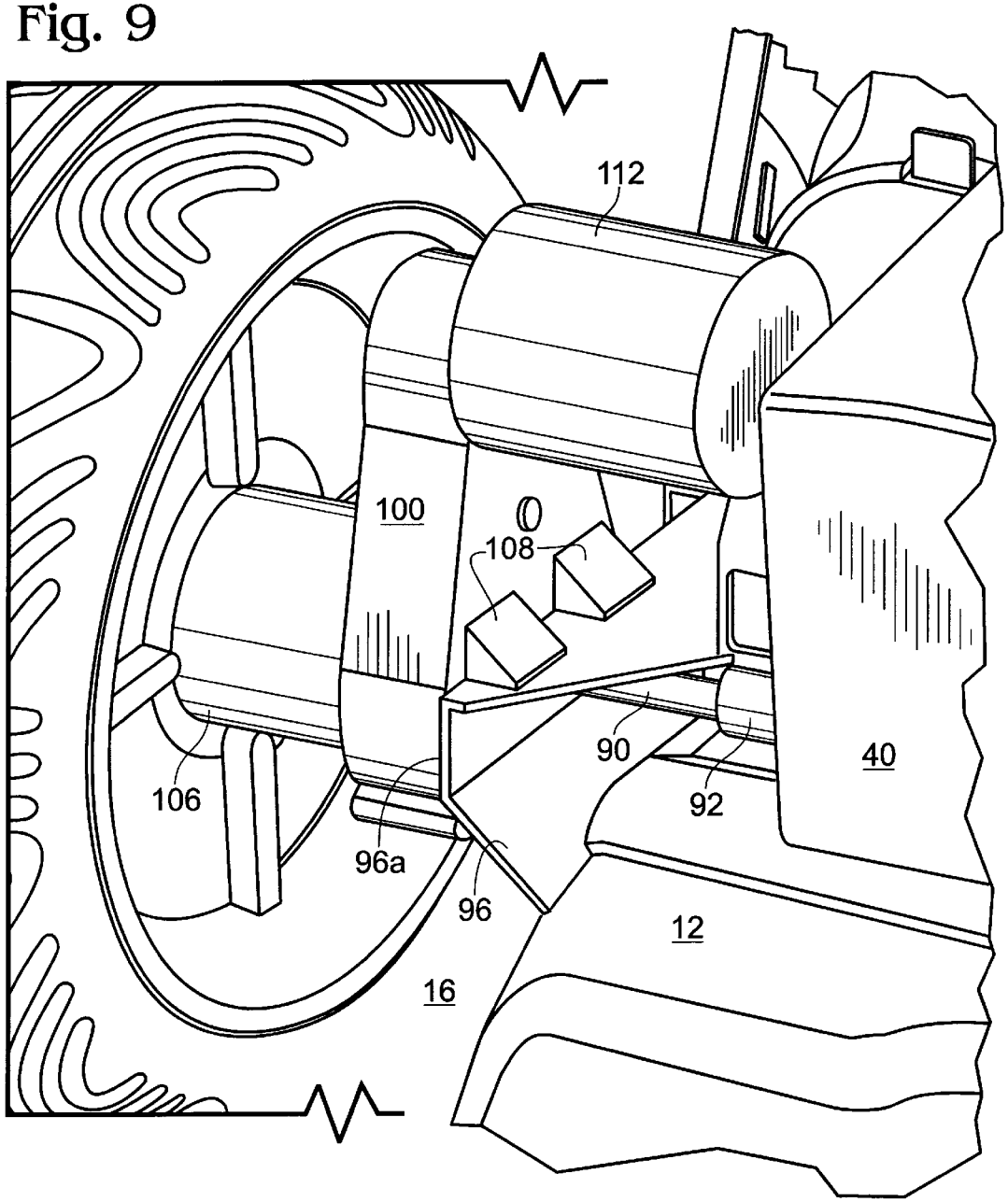
FIG. 9 is an isometric, close-up view of the gearbox, motor, and driver mounting on an axle and held in place by a rib on the underside of the vehicle of FIG. 1.

FIG. 8 is a schematic diagram of a switching circuit 116 showing how joysticks 20, 22 and foot pedal 74 control motors 112, 114 to drive the vehicle. Foot pedal 74, shown in its nominal off/braking position, operates a power switch 118 shown in its nominal off/braking position. The motors' armature windings (not shown) are connected to terminals 112a, 112b and 114a, 114b on the motors. In the off/braking position of the foot pedal and power switch, each motors' armature windings are shorted, motor 112 through wires 52M and 52I, the power switch and wire 52N, motor 114 through wires 52K and 52J, the power switch and wire 52L. Shorting the armature of each motor provides dynamic braking if the motor was rotating prior to the shorting and disables the motor is the motor was not rotating prior to the shorting.

A left direction switch 120 is controlled by left joystick 20 and a right direction switch 122 is controlled by joystick 22. Joysticks 20, 22 and direction switches 120, 122 are shown in the neutral position which disconnects the battery from the motors and allows freewheeling of the motors when foot pedal 74 and power switch 118 are in the on position.

Depressing the foot pedal moves it to the on position which corresponds to an on position of power switch 118. In the on position, one terminal 112a, 114a of each motor's armature is connected through power switch 118 to a direction switch 120, 122, respectively. In the on position, left motor armature terminal 112a is connected through wires 52N and 52O to left direction switch 120 and right motor armature terminal 114a is connected through wires 52L and 52P to right direction switch 122. The other armature terminals 112b, 114b are directly connected to direction switches 120, 122 by wires 52M and 52K, respectively, and thus the on position enables the joysticks and direction switches to control the connection of battery power to the motor, and the polarity of that connection, thus controlling the rotation, and direction of rotation of each motor and each wheel.

The following description applies when the joysticks are enabled by the foot pedal and the direction switch. When left joystick 20 and left direction switch 120 are moved to the forward position, as indicated by arrows LJF, left motor armature terminal 112a is connected through power switch 116, direction switch 120 and wires 52A and 46 to the positive terminal of battery 38 and left motor armature terminal 112b is connected through direction switch 120, and wires 52B and 48 to the negative terminal of battery 38 in a first polarity, causing motor drive shaft 124 to rotate, as indicated by arrows LMR, in a first direction which turns wheel 16 in a forward direction. When right joystick 22 and right direction switch 122 are moved to the forward position, as indicated by arrows RJF, right motor armature terminal 114a is connected through power switch 118, direction switch 122 and wires 52E, 52D, 52C, 52B and 48 to the negative terminal of battery 38 and right motor armature terminal 114b is connected through direction switch 122 and wires 52H, 52G, 52F, 52A and 46 to the positive terminal in a first polarity, causing right motor drive shaft to rotate, as indicated by arrows RMR, in a first direction which turns wheel 18 in a forward direction. The polarity for the right motor is reversed from that of the left motor because the motors are mounted in reverse directions. When left joystick 20 and left direction switch 120 are moved to the reverse position, as indicated by arrows LJR, left motor armature terminal 112a is connected through power switch 118, direction switch 120 and wires 52C, 52B, and 48 to the negative terminal of battery 38 and left motor armature terminal 112b is connected through direction switch 120 and wires 52F, 52A, and 46 to the positive terminal of battery 38 in a second polarity opposite to the first polarity, causing motor drive shaft 124 to rotate, as indicated by arrows LMR, in a second direction opposite the first direction, which turns wheel 16 in a reverse direction. When right joystick 22 and right direction switch 122 are moved to the reverse position, as indicated by arrows RJR, right motor armature terminal 114a is connected through power switch 118, direction switch 122 and wires 52G, 52F, 52A and 46 to the positive terminal of battery 38 and right motor armature terminal 114b is connected through direction switch 122 and wires 52D, 52C, 52B, and 48 to the negative terminal of battery 38 in a second polarity opposite the first polarity, causing right motor drive shaft to rotate, as indicated by arrows RMR, in a second direction, opposite the first, which turns wheel 18 in a reverse direction. Thus, switching circuit 116 is interposed between battery 38 and motors 112, 114 and is operable by the driver, through control of the joysticks, independently to control the motors to turn in a forward or reverse direction to drive each wheel independently of the other in the forward or reverse directions.

The substantially equal speeds of the wheels when turning opposite relative to one another is obtained automatically by operation of the joystick and there is no adjustment required to equalize the speeds. This makes it easy to spin the vehicle about a central point SP as shown by arrows S in FIG. 1. Operation of both joysticks forward moves vehicle forward as indicated by arrow F and moving both joysticks backwards moves the vehicle in reverse as indicated by arrow R. Gentle arcing turning as indicated by arrows LT and RT in FIG. 1 may be obtained with one joystick forward and the other in neutral.

Figure 5:
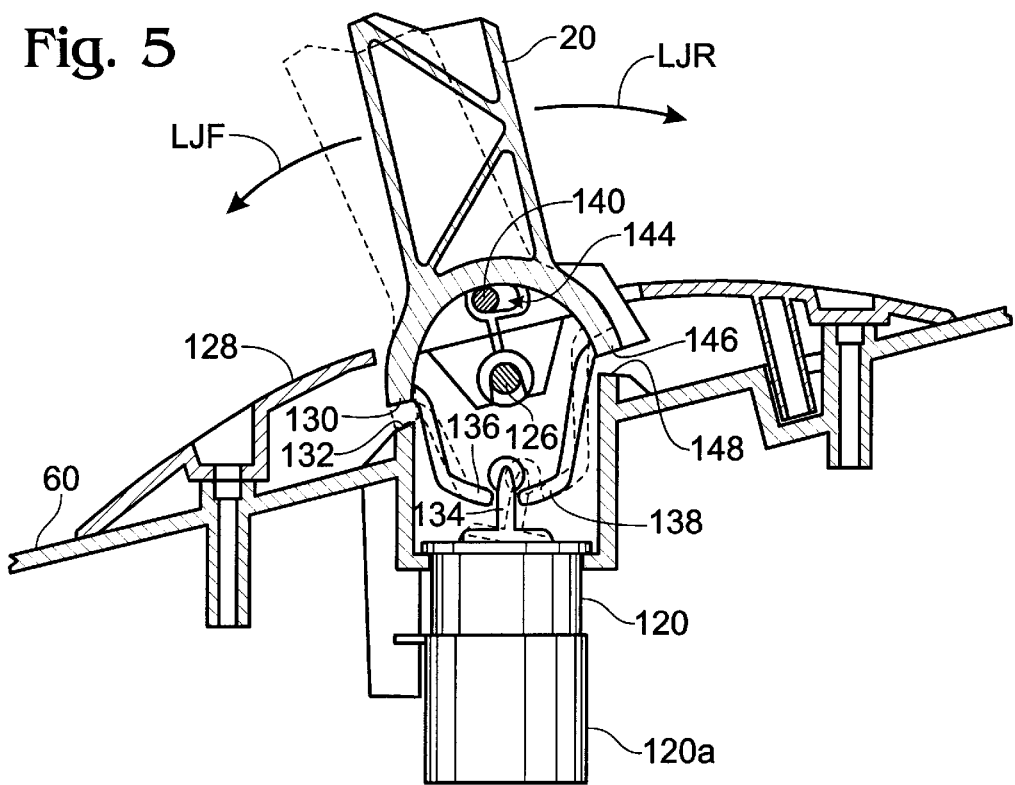
FIG. 5 is a side cross-sectional view of the left joystick of the vehicle of FIG. 1, showing a mounting base bolted to the armrest, a pivot pin for the joystick, a direction switch operated by the joystick, and a reverse lock-out pin.
Figure 6:
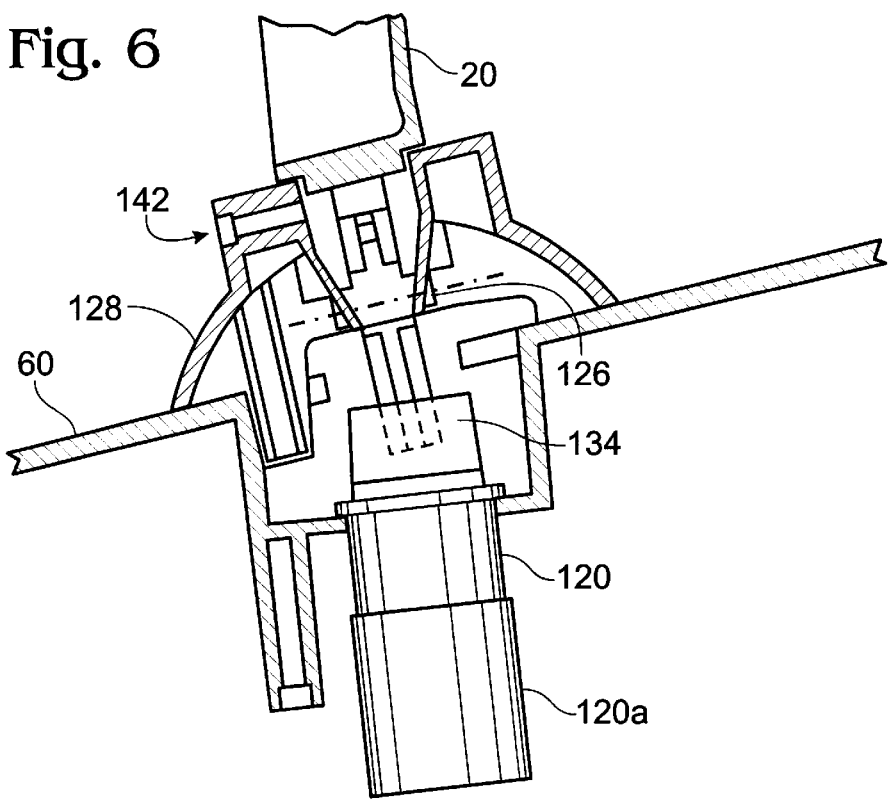
FIG. 6 is a front cross-sectional view of the left joystick of the vehicle of FIG. 1, showing an aperture for the reverse lock-out pin.

FIGS. 5 and 6 show how the left joystick, which is representative of the right joystick, is operable to control direction switch 120 which preferably includes a separable connector 120a. Joystick 20 and a lever 134 on direction switch 120 are shown in solid line in the neutral position. Joystick 20 is pivotally mounted on a pivot pin 126 which is held in a mounting base 128 bolted to armrest 60. Joystick 20 is nominally biased to the neutral position. Pivot pin 126 allows joystick 20 to be pushed forward, as shown by arrows LJF, to the forward position, limited by a forward stop 130 which contacts an abutment 132 on armrest 60 in the forward position. As indicated by the dashed lines, which show joystick 20 in the forward position, direction switch lever 134 is moved by a depending arm 136 of joystick 20 rearwards to place direction switch 120 in the forward position. When joystick 20 is moved back to the neutral position, a depending arm 138 opposite arm 136 pushes lever 134 back to the neutral position. FIG. 5 shows a reverse lock-out pin 140 which can be inserted through an aperture 142 (FIG. 6) in base 128 and into a slot 144 in joystick 20. Pin 140 prevents joystick 20 from being pulled back to the reverse position, as indicated by arrow LJR. This is a safety feature for children who cannot safely drive the car in the reverse direction. However, pin 140 can be removed, as shown in FIG. 6, and joystick 20 can be pulled back to the reverse position wherein lever 134 is driven forward by arm 138 placing direction switch 120 in the reverse position and a reverse stop 146 on joystick 20 contacts an abutment 148 on armrest 60 (FIG. 5).

While the present invention has been shown and described with reference to the foregoing preferred embodiments, it is to be understood by those skilled in the art that other changes in form and detail may be made therein without departing from the spirit and scope of the invention as defined in the appended claims.

It is claimed and desired to secure by Letters Patent:

1. A children's ride-on vehicle comprising:
   a chassis configured to accommodate a driver;
   first and second driven wheels rotatably mounted on the chassis;
   an electrical power source mounted to the chassis;
   first and second electric motors powered by the source and mounted to the chassis, the first and second motors configured to provide a motive power to the first and second wheels, respectively, to drive each wheel selectively in a forward direction or a reverse direction; and
   a switching circuit interposed between the source and the motors, the circuit operable by the driver to control the motors independently to turn in a forward or a reverse direction to drive each wheel independently of the other wheel in the forward or reverse directions, the switching circuit including a power switch interposed between the source and the motors, the power switch having an off position and an on position, the switch in the on position providing electrical power from the source to the motors, the power switch in the off position disconnecting electrical power from the motors and configuring the motor for dynamic braking.

2. The vehicle of claim 1, wherein the wheels are operable at a forward revolutions per minute and a reverse revolutions per minute and the wheel revolutions per minute are substantially equal.

3. A children's ride-on vehicle comprising:
   a chassis configured to accommodate a driver;
   first and second driven wheels rotatably mounted on the chassis;
   an electrical power source mounted to the chassis;
   first and second electric motors powered by the source and mounted to the chassis, the first and second motors configured to provide a motive power to the first and second wheels, respectively, to drive each wheel selectively in a forward direction or a reverse direction; and
   a switching circuit interposed between the source and the motors, the circuit operable by the driver to control the motors independently to turn in a forward or a reverse direction to drive each wheel independently of the other wheel in the forward or reverse directions wherein the wheels are operable at a forward revolutions per minute and a reverse revolutions per minute and the wheel revolutions per minute are substantially equal, and
   further comprising a seat mounted to the chassis, a pair of armrests mounted to the chassis adjacent the seat, and a pair of joysticks mounted on the armrests and coupled to the switching circuit, the joysticks configured to be held by the driver with the driver's arms on the armrests, the joysticks operable independently to control the motors to turn in the forward and reverse directions, the armrests provided at a height adjacent the driver's shoulders, and supporting the driver's arms in a generally level attitude.

4. The vehicle of claim 1 wherein the vehicle is for operation over a plane surface and wherein the chassis has a lower edge defining a plane and further comprising a caster wheel mounted to the chassis and configured to cooperate with the driven wheels to hold the chassis in a level attitude with the plane of the lower edge substantially parallel to the plane surface.

5. The vehicle of claim 1 wherein the vehicle is for operation over a plane surface and wherein the chassis has a lower edge defining a plane and further comprising a skid pad mounted to the chassis and configured to contact and slide along the plane surface, the skid pad maintaining the chassis in a level attitude with the plane of the lower edge substantially parallel to the plane surface.

6. The vehicle of claim 1 wherein the motors are DC electric motors, the electrical power source is a battery, and the switching circuit includes first and second direction switches interposed between the battery and the respective motors, the direction switches each having a forward position and a reverse position, each direction switch in the forward position connecting its respective motor to the battery in a first polarity for motor rotation in the forward direction, each direction switch in the reverse position connecting its respective motor to the battery in a second polarity, opposite to the first, for motor rotation in the reverse direction.

7. The vehicle of claim 6 wherein the directions switches each have a neutral position disconnecting its respective motor from the battery.

8. The vehicle of claim 1 further comprising a reverse lock-out pin which can be coupled to one of the joysticks to prevent the vehicle from being driven in the reverse direction.

9. The vehicle of claim 3 wherein the chassis further comprises two side walls adjacent the driver's chest.

10. The vehicle of claim 1 further comprising a foot pedal mounted to the chassis and operable to control the power switch, the foot pedal nominally biased to the off position and depressible by the driver's foot to the on position.

11. A children's ride-on vehicle for operation over a plane surface, the vehicle comprising:
   a chassis and a seat mounted to the chassis, the seat configured to accomodate a driver;
   first and second driven wheels rotatably mounted to the chassis;
   a rotatable support mounted to the chassis and cooperating with the driven wheels to hold the chassis in a level attitude; and a motive power source mounted to the chassis operable by the driver selectively to drive each wheel independently of the other in a forward or a reverse direction, each wheel driven by the motive power source at a forward revolutions per minute and a reverse revolutions per minute, wherein the forward and reverse revolutions per minute are substantially equal, wherein the motive power source includes first and second electric motors and an electrical power source mounted to the chassis and further comprising a switching circuit interposed between the electrical power source and the motors, the circuit operable by the driver independently to control the motors to turn in a forward or a reverse direction to drive each wheel independently of the other wheel in the forward or reverse directions.

12. The vehicle of claim 11 wherein the switching circuit includes first and second direction switches for controlling the direction of rotation of the respective motors and a power switch having an off position operable to disconnect electrical power from both motors.

13. The vehicle of claim 12 wherein the power switch in the off position is operable to configure the motors for dynamic braking.

14. The vehicle of claim 12 wherein the direction switches each have a neutral, forward, and reverse position, each direction switch in the neutral position disconnecting its respective motor from the battery and allowing freewheeling of the motor, each direction switch in the forward position configuring its respective motor for rotation in the forward direction, each direction switch in the reverse position configuring its respective motor for rotation in the reverse direction.

15. The vehicle of claim 12 further comprising a foot pedal mounted to the chassis and wherein the power switch is nominally biased to the off position and the foot pedal is configured to be depressed to operate the power switch to an on position in which the direction switches can be operated to apply power to the motors.

16. A children's ride-on vehicle for operation over a plane surface, the vehicle comprising:
 a chassis and a seat mounted to the chassis, the seat configured to accomodate a driver;
 first and second driven wheels rotatably mounted to the chassis;
 a rotatable support mounted to the chassis and cooperating with the driven wheels to hold the chassis in a level attitude; and
 a motive power source mounted to the chassis operable by the driver selectively to drive each wheel independently of the other in a forward or a reverse direction, each wheel driven by the motive power source at a forward revolutions per minute and a reverse revolutions per minute, wherein the forward and reverse revolutions per minute are substantially equal,
 further comprising armrests mounted to the chassis adjacent the seat, the armrests configured for the driver to place the arms generally level on the armrests at a height allowing the driver to place substantial weight on the armrests during vehicle maneuvering.

17. A children's ride-on vehicle for operation over a plane surface, the vehicle comprising:
 a chassis formed at least in part of molded plastic, the chassis having a lower edge defining a plane;
 a seat mounted to the chassis and configured to accommodate a driver;
 first and second driven wheels mounted to the chassis on opposite sides of the seat, the wheels rotatable in a first plane and a second plane, wherein the wheel planes are substantially parallel to one another;
 a battery having a positive terminal and a negative terminal, the battery mounted to the chassis and configured to provide an output voltage between the terminals;
 first and second electric DC motors mounted to the chassis, the first and second motors configured to provide a motive power to the first and second wheels, respectively, to drive each wheel selectively in a forward direction or a reverse direction, the motors each having a drive shaft rotatable at a motor revolutions per minute in either of two directions;
 first and second gear trains operatively coupled to the drive shafts of the first and second motors, respectively, and to the first and second wheels, respectively, the gear trains configured to turn the wheels at a wheel revolutions per minute that is less than the motor revolutions per minute;
 a foot pedal mounted to the chassis adjacent the seat, the foot pedal configured to be operated by the driver's foot, the foot pedal nominally biased to an off/braking position and depressible by the driver's foot to an on position;
 first and second joysticks mounted to the chassis adjacent the seat and configured to be operated by the driver's right and left hands, respectively, the joysticks each having a neutral, a forward and a reverse position, the joysticks nominally biased to the neutral position;
 a power switch interposed between the battery and the motors, the power switch having an off/braking position and an on position, the switch operable by the foot pedal to the corresponding positions, the power switch in the on position providing electrical power from the battery to the motors, the power switch in the off/braking position disconnecting the electrical power and configuring the motors for dynamic braking;
 first and second direction switches interposed between the battery and the respective motors, each direction switch having a neutral, a forward and a reverse position, the switches operable by the corresponding joysticks to the corresponding positions, each direction switch in the neutral position disconnecting its respective motor from the battery and allowing freewheeling of the motor, each direction switch in the forward position connecting its respective motor to the battery terminals in a first polarity for drive shaft rotation in a forward direction, each direction switch in the reverse position connecting its respective motor to the battery terminals in a second polarity, opposite to the first, for drive shaft rotation in a reverse direction;
 a caster wheel mounted to the chassis aft of the driven wheels, the caster wheel configured to cooperate with the driven wheels to hold the chassis in a level attitude with the plane of the lower edge generally parallel to the plane surface; and
 a skid pad mounted to the chassis forward of the driven wheels and configured to contact and slide along the surface, the skid pad maintaining the chassis generally in the level attitude, when the caster wheel loses contact with the surface.

18. A children's ride-on vehicle comprising:
 a chassis and a seat mounted to the chassis, the seat configured to accommodate a driver;

first and second driven wheels mounted to the chassis on opposite sides of the seat;

a battery having a positive terminal and a negative terminal, the battery mounted to the chassis and configured to provide an output voltage between the terminals;

first and second electric DC motors mounted to the chassis to drive each wheel selectively in a forward direction or a reverse direction;

first and second joysticks mounted to the chassis adjacent the seat and configured to be operated by the driver's right and left hands, respectively, the joysticks each having a neutral, a forward and a reverse position, the joysticks nominally biased to the neutral position, each joystick in the neutral position disconnecting its respective motor from the battery and allowing freewheeling of the motor, each joystick in the forward position connecting its respective motor to the battery terminals in a first polarity for rotation in a forward direction, each joy stick in the reverse position connecting its respective motor to the battery terminals in a second polarity, opposite to the first, for rotation in a reverse direction.

19. The vehicle of claim 18 further comprising a power switch interposed between the battery and the motors, the power switch having an off position and an on position, the switch in the on position providing electrical power from the battery to the motors, the power switch in the off position disconnecting electrical power from the motors and configuring the motor for dynamic braking.

20. The vehicle of claim 18 further comprising a foot pedal mounted to the chassis adjacent the seat, the foot pedal configured to be operated by the driver's foot, the foot pedal nominally biased to an off position and depressible by the driver's foot to an on position.

21. The vehicle of claim 18 wherein the vehicle is adapted for operation over a surface, and further comprising a rotatable support and a skid pad mounted to the chassis, wherein the support is configured to cooperate with the driven wheels to maintain the chassis in a generally level attitude, and further wherein the skid pad is adapted to maintain the chassis in the generally level attitude when the rotatable support loses contact with the surface.

22. The vehicle of claim 18 further comprising a pair of armrests mounted to the chassis adjacent the seat, wherein the armrests are configured to support the driver's arms at a height allowing the driver to place substantial weight on the armrests during vehicle maneuvering.

* * * * *